United States Patent Office 3,454,600
Patented July 8, 1969

3,454,600
13-LOWER ALKYL-17-ALPHA-HALOETHYNYL-17-BETA - HYDROXY - 4,9 - GONADIEN - 3 - ONE STEROIDS AND INTERMEDIATE COMPOUNDS
David Taub, Metuchen, N.J., assignor to Merck & Co., Inc., Rahway, N.J., a corporation of New Jersey
No Drawing. Filed Aug. 13, 1965, Ser. No. 479,627
Int. Cl. C07d 7/20; C07c 171/00; A61k 27/00
U.S. Cl. 260—345.2                           15 Claims

ABSTRACT OF THE DISCLOSURE

The invention disclosed herein relates to novel processes for the preparation of compounds which are orally and parenterally active progestational agents and to novel intermediate compounds which are useful in the preparation of compounds having utility as orally and parenterally active progestational agents. More particularly, this invention relates to novel processes for the preparation of 13-lower alkyl - 17α-haloethynyl-17β-hydroxy-4,9-gonadien-3-one steroids, which are valuable as progestational agents and are useful in the regulation of the estrus cycle in domestic animals, and to the intermediate compounds in the processes for the preparation of such 13-lower alkyl-17α - haloethynyl - 17β - hydroxy - 4,9 - gonadien - 3-one steroids. In this process, 2-methyl-5-oxo-4H-5,6,7,8-tetrahydrochromene is reacted with a vinyl magnesium halide to form 2-methyl-5-vinyl-5-hydroxy-4H-5,6,7,8-tetrahydrochromene which is then reacted with a 2-lower alkyl-cyclopentane-1,3-dione to produce 3-methyl-13-lower alkyl - 8,14 - seco - 4 - oxagona - 2,5(10),9(11)-triene-14,17-dione; the latter compound is treated with a strong acid thereby closing the C-ring to produce 3-methyl - 13 - lower alkyl - 4 - oxagona - 2,5(10),8,14-tetraene-17-one which upon reaction with an aqueous solution of an organic acid is converted by the opening of the A-ring to 13-lower alkyl-4,5-secogona-8,14-diene-3,5,17-trione; the last-named compound is then reacted with hydrogen, thereby reducing the Δ¹⁴-double bond to produce 13-lower alkyl-4,5-secogona-8-ene-3,5,17-trione which is then reacted with an alkali metal alkoxide to close the A-ring and form the corresponding 13-lower alkyl-4,9-gonadien-3,17-dione. The latter compound is then reacted with a haloethynylation agent to produce 13-lower alkyl - 17α - haloethynyl - 17β - hydroxy - 4,9-gonadien-3-one.

The 13-lower alkyl-17α-haloethynyl-17β-hydroxy-4,9-gonadien-3-one steroids have been shown to have utility as progestational agents and because of this property they may be used to regulate the estrus cycle in domestic animals and in cases of menstrual disturbances may be used to reestablish the normal relationships between the anteriorpituitary, ovary, and endometrium which are present in a normal estrus cycle. They may also be used to synchronize the estrus cycles of a herd or colony of domestic animals. When used for these purposes, they may be supplied together or in succession with an estrogenic hormone.

Because of their progesterone-like effects, they affect the scretion of gonadotropins and thus act to regulate ovulation and endometrial and placental development. When combined with estrogens or androgens, they reduce fertility. They also have utility in correcting disorders such as dysmenorrhea, amenorrhea, threatened abortion, endometriosis, and the like.

The novel processes of this invention, starting with 2-methyl-5-oxo-4H-5,6,7,8-tetrahydro chromene, may be schematically represented by the following series of reactions wherein R is a lower alkyl substituent, preferably having not more than five carbon atoms, such as methyl, ethyl, propyl, isopropyl, butyl, isobutyl, tertiary-butyl, pentyl and isopentyl radicals:

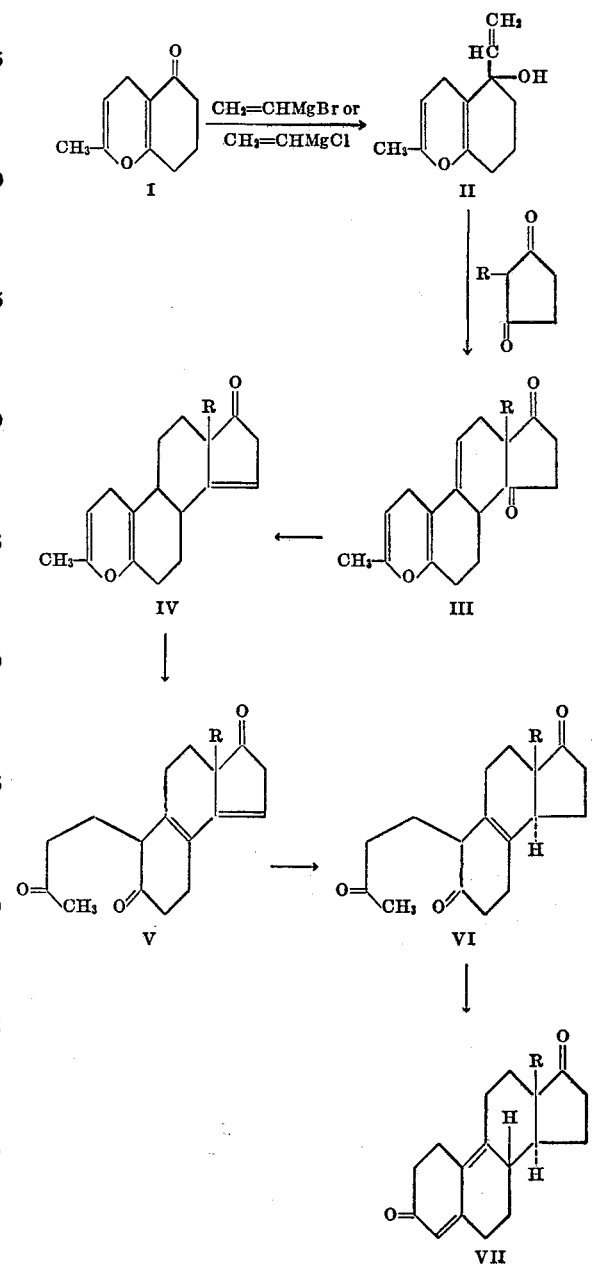

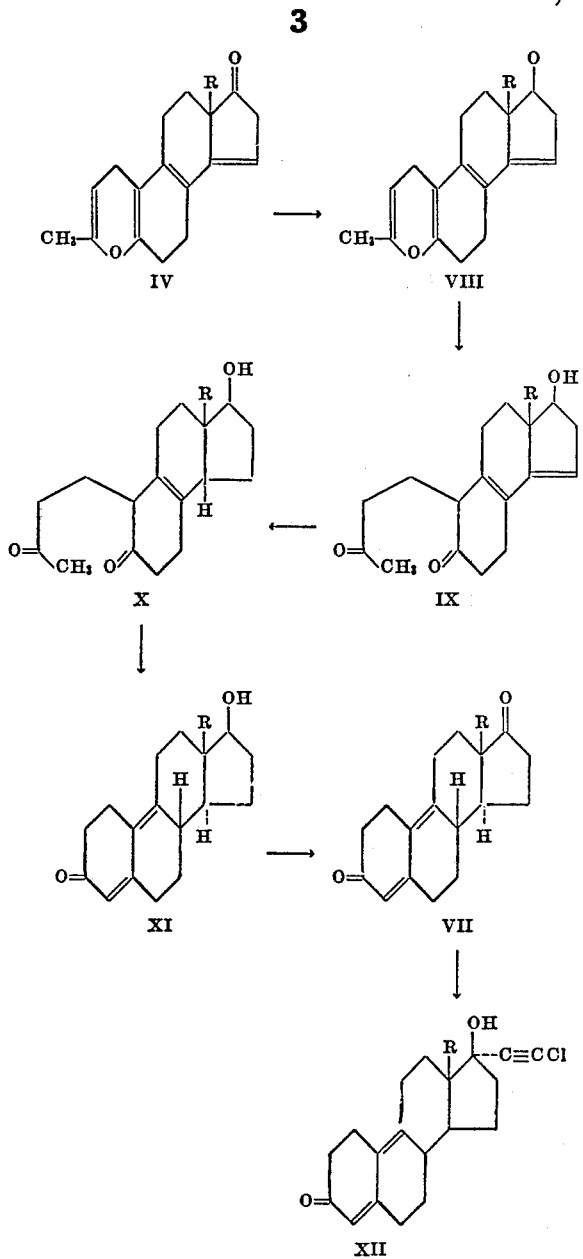

The starting material in the novel processes of this invention is 2-methyl-5 - oxo - 4H-5,6,7,8-tetrahydro chromene (Compound I). The first step in the processes of this invention is the reaction of Compound I with a vinyl magnesium halide to provide 2-methyl-5-vinyl-5-hydroxy - 4H - 5,6,7,8 - tetrahydro chromene (Compound II). The second step is the reaction of Compound II with 2-lower alkyl-cyclopentane-1,3-dione to provide 3-methyl-13-lower alkyl-8,14-seco-4 oxagona-2,5(10),9(11)-triene-14,17-dione (Compound III). The third step is the treatment of Compound III with a strong acid, such as hydrogen chloride, phosphoric acid, sulfuric acid, or paratoluenesulfonic acid, to close the C-ring and provide 3-methyl-13-lower alkyl-4-oxagona - 2,5(10),8,14-tetraen-17-one (Compound IV). The fourth step is the opening of the A-ring of Compound IV by treatment with an aqueous solution of an organic acid, such as acetic acid, propionic acid, or oxalic acid, to provide 13-lower alkyl-4,5-secogona-8,14-diene-3,5,17-trione (Compound V). The fifth step is the hydrogenation of the $\Delta^{14}$-double bond of Compound V to provide 13-lower alkyl-4,5-secogona-8-ene-3,5,17-trione (Compound VI). The sixth step is the closure of the A-ring of Compound VI by treatment with an alkali metal lower alkoxide to provide 13-lower alkyl - 4,9 - gonadiene - 3,17 - dione (Compound VII).

In an alternate process for the production of Compound VII, the first step is the reduction of the 17-keto group of Compound IV to a 17β-hydroxy group by treatment of Compound IV with a reducing agent, such as lithium aluminum hydride in a lower aliphatic ether or sodium borohydride in a lower aliphatic alcohol, to provide 3-methyl-13-lower alkyl-4-oxagona-2,5(10),8,14 - tetraen-17β-ol (Compound VIII). The second step is the opening of the A-ring of Compound VIII to provide 13-lower alkyl-17β-hydroxy-4,5-secogona-8,14-diene - 3,5 - dione (Compound IX). This is accomplished in the same manner as opening of the A-ring of Compound IV. The third step is the catalytic hydrogenation of the $\Delta^{14}$-double bond of Compound IX to provide 13-lower alkyl-17β-hydroxy-4,5-secogona-8-ene-3,5-dione (Compound X). The hydrogenation of Compound IX is accomplished in the same manner as the hydrogenation of the $\Delta^{14}$-double bond of Compound V. The fourth step is the closure of the A-ring of Compound X to provide 13-lower alkyl-17β-hydroxy-gona-4,9-dien-3-one (Compound XI). The closure of the A-ring of Compound X is accomplished in the same manner as closure of the A-ring of Compound VI. The fifth step is the oxidation of the 17β-hydroxy group of Compound XI to a 17-keto group to provide Compound VII. The oxidation is accomplished by the use of a mild oxidizing agent, such as sodium dichromate in glacial acetic acid, a mixture of chromic acid anhydride in pyridine, or a mixture of chromic acid, sulfuric acid and acetone. Compound VII, prepared by either of the two routes described above, is haloethynylated to provide 13-lower alkyl-17α-haloethynyl-17β-hydroxy-4,9-gonadien-3 - one (Compound XII). This is conveniently accomplished by the use of an equal molar amount of haloethyne which is preferably formed in situ by the reaction of a 1,2-dihaloethylene (preferably in cis form) and methyl lithium.

The first step in the first process for the preparation of 13-lower alkyl-17α-haloethynyl-17β-hydroxy - 4,9 - gonadiene-3-one steroids by the reaction of 2-methyl-5-oxo-4H-5,6,7,8-tetrahydro chromene (Compound I) with vinyl magnesium halide, such as vinyl magnesium bromide or vinyl magnesium chloride, to produce 2-methyl-5-vinyl-5-hydroxy-4H-5,6,7,8-tetrahydro chromene (Compound II) may be conveniently accomplished by adding a solution of Compound I in tetrahydrofuran and ether to a solution of the vinyl magnesium halide in tetrahydrofuran, which is maintained at a temperature of about −5° C. The temperature of the reaction mixture is allowed to come to room temperature with stirring. The product is isolated by cooling the reaction mixture to below 0° C. and carefully adding saturated aqueous ammonium chloride solution. The inorganic slurry is separated from the organic layer and extracted with ether, the organic layer and the ether extract are combined, washed with aqueous potassium bicarbonate solution, dried over anhydrous sodium sulfate, and concentrated to dryness under reduced pressure. The residue is Compound II.

In the second step, the reaction of Compound II with 2-lower alkyl-cyclopentane-1,3-dione to provide 3-methyl-13-lower alkyl-8,14-seco-4-oxagona - 2,5(10),9 (11)-triente-14,17-dione (Compound III) may be accomplished by refluxing a solution of Compound II and 2-lower alkyl-cyclopentane-1,3-dione in xylene and tertiary-butanol under nitrogen. In isolating the reaction product, the reaction mixture is cooled, ether is added, the resulting slurry is washed with aqueous potassium bicarbonate solution and then with aqueous sodium chloride solution. The organic layer is dried over magnesium sulfate and concentrated to dryness under reduced pressure. The residue is Compound III.

Compound III is treated in a third step with a strong acid, such as hydrogen chloride, phosphoric acid, sulfuric acid or anhydrous para-toluenesulfonic acid, in solution in an anhydrous aromatic solvent, such as benzene, toluene, or xylene, to close the C-ring and provide 3-methyl-13-lower alkyl-4-oxagona - 2,5(10),8,14 - tetraen-17-one (Compound IV). The reaction mixture is maintained at a temperature of about 60° C. under a gentle stream of nitrogen for about 30 minutes. The reaction product may be conveniently isolated by cooling the reaction mixture and adding benzene and water. The organic phase is then separated, washed with dilute aqueous potassium bicarbonate solution, washed with saturated sodium chloride solution, dried over magnesium sulfate, and the solvent is removed under reduced pressure. The residue is Compound IV.

The A-ring of Compound IV is opened by heating a solution of Compound IV in an aqueous solution of an organic acid, such as aqueous acetic acid, propionic acid or oxalic acid, for about 3 hours to provide 13-lower alkyl-4,5-secogona-8,14-diene-3,5,17-trione (Compound V). In order to isolate Compound V, the solution is cooled, and concentrated under reduced pressure to near dryness. Water is added to the concentrate and this mixture is extracted with chloroform. The chloroform extract is washed with dilute aqueous potassium bicarbonate solution, then with saturated aqueous sodium chloride solution, and dried over magnesium sulfate. The solvent is removed by distillation under reduced pressure. The residue is Compound V.

The hydrogenation of Compound V to provide 13-lower alkyl-4,5-secogona-8-ene-3,5,17-trione (Compound VI) may be catalyzed by palladium, more particularly, 5% palladium on charcoal, and is conducted at a temperature of about 25° C. and a pressure of one atmosphere of hydrogen until one molecular equivalent of hydrogen has been absorbed. The catalyst is removed by filtration and the solvent is removed by distillation under reduced pressure. The residue is 13-lower alkyl-4,5-secogona-8-ene-3,5,17-trione (Compound VI).

Closure of the A-ring of Compound VI may be accomplished by refluxing a solution of Compound VI in a lower aliphatic alcohol, such as methanol or ethanol, containing an alkali metal lower alkoxide, such as sodium or potassium methoxide, sodium or potassium ethoxide, under nitrogen for about four hours to provide 13-lower alkyl-4,9-gonadiene-3,17-dione (Compound VII). To isolate Compound VII, the reaction mixture is cooled, neutralized with a weak acid, such as dilute aqueous acetic acid, and concentrated under reduced pressure to near dryness. Water is added to the residue, the mixture is extracted with ether, the ether layer is washed with saturated aqueous sodium chloride solution, dried over magnesium sulfate, and the ether is removed by distillation under reduced pressure. The residue is Compound VII.

Compound VII is ethynylated by the use of an equimolar amount of ethynylating agent, such as an ethynylating agent prepared by adding a solution of methyl lithium in dry ether to chloroethylene, to provide 13-lower alkyl-17α-chloroethynyl-17β-hydroxy - 4,9 - gonadien-3-one (Compound XII).

According to the alternate process of this invention for the preparation of Compound VII, Compound IV is the starting substance. The first step in the alternate synthesis is the reduction of the 17-keto group of Compound IV to a hydroxy group to provide 3-methyl-13-lower alkyl-4-oxagona-2,5(10),8,14-tetraen - 17β - ol (Compound VIII). The reduction may be accomplished by adding a solution of Compound IV in a lower aliphatic alcohol, such as ethanol, propanol, isopropanol or butanol, in a dropwise manner to a solution of sodium borohydride in a lower aliphatic alcohol or by adding a solution of Compound IV in a lower aliphatic ether to a solution of lithium aluminum hydride in a lower aliphatic ether. The temperature is maintained at about 0° C. during the addition and for about 40 minutes after addition is complete. The reaction product may be isolated from the reaction mixture by adding dilute aqueous acetic acid slowly to the reaction mixture, adding saturated aqueous sodium chloride solution, extracting with ether, washing the ether extract with dilute aqueous potassium bicarbonate solution, drying the solution over magnesium sulfate, and removing the solvent by distillation under reduced pressure. The residue is Compound VIII.

Opening of the A-ring of Compound VIII to provide 13-lower alkyl-17β-hydroxy-4,5-secogona-8,14 - diene - 3,5-dione (Compound IX) is accomplished in the same manner described above for the opening of the A-ring of Compound IV.

The $\Delta^{14}$-double bond of Compound IX may be hydrogenated to provide 13-lower alkyl-17β-hydroxy-4,5-secogona-8-ene-3,5-dione (Compound X). Hydrogenation is accomplished in the same manner described above with respect to the hyrdrogenation of the $\Delta^{14}$-double bond of Compound V.

Closure of the A-ring of Compound X to provide 13-lower alkyl-17β-hydroxy-4,9-gonadien-3-one (Compound XI) may be accomplished in the same manner described above in connection with the closure of the A-ring of Compound VI.

The oxidation of the 17β-hydroxy group of Compound XI to a keto group to provide Compound VII may be accomplished by the use of a mild oxidizing agent, such as sodium dichromate in glacial acetic acid, a mixture of chromic acid anhydride and pyridine, or a mixture of chromic acid, sulfuric acid and acetone. Compound VII may be conveniently isolated from the reaction mixture by the addition of water to precipitate Compound VII, addition of saturated sodium chloride solution, extraction with ether, washing the ether extract with dilute aqueous potassium bicarbonate solution, drying the ether extract over magnesium sulfate, and finally removing the ether by distillation under reduced pressure. The residue is Compound VII.

The following examples illustrate methods of carrying out the present invention, but it is to be understood that these examples are given for purposes of illustration and not of limitation.

Example 1.—2-methyl-5-vinyl-5-hydroxy-4H-5,6,7,8-tetrahydro chromene

Five grams of vinyl bromide in 5 ml. of tetrahydrofuran are added dropwise to a stirred suspension of 900 mg. of magnesium turnings and 9 ml. of tetrahydrofuran which is kept under nitrogen. During the addition the temperature is maintained at 50–60° C. The solution of Grignard reagent is cooled to —5° C. and a solution of 1.6 g. of 2-methyl-5-oxo4H-5,6,7,8-tetrahydro chromene in 5 ml. of tetrahydrofuran and 15 ml. of ether is added over a period of 20 minutes. The mixture is stirred at room temperature for three hours and then cooled to —5° C. Fifteen milliliters of saturated aqueous ammonium chloride solution is added dropwise to the cooled reaction mixture. The inorganic slurry is separated from the organic layer and extracted with ether. The ether extract is added to the organic layer and the combined solution is washed with dilute aqueous potassium bicarbonate solution, dried over anhydrous sodium sulfate and concentrated to dryness under reduced pressure. The residue is 2 - methyl - 5 - vinyl - 5 - hydroxy - 4H - 5,6,7,8 - tetrahydro chromene.

Example 2.—3,13-dimethyl-8,14-seco-4-oxagona-2,5(10), 9(11)-triene-14,17-dione

A solution of 840 mg. of 2-methyl-5-vinyl-5-hydroxy-4H-5,6,7,8-tetrahydro chromene and 540 mg. of 2-methylcyclopentane-1,3-dione in 6 ml. of xylene and 3 ml. of tertiarybutanol is refluxed under nitrogen for three hours.

The reaction mixture is cooled, ether is added and the resulting slurry is washed with 5% aqueous potassium bicarbonate solution and then with saturated aqueous sodium chloride solution. The organic layer is dried over magnesium sulfate and concentrated to dryness under reduced pressure. The residue is 3,13-dimethyl-8,14-seco-4-oxagona-2,5(10),9(11)-triene-14,17-dione.

Example 3.—3-methyl-13-ethyl-8,14-seco-4-oxagona-2,5(10),9(11)-triene-14,17-dione A solution of 840 mg. of 2-methyl-5-vinyl-5-hydroxy-4H-5,6,7,8-tetrahydro chromene and 540 mg. of 2-ethylcyclopentane-1,3-dione in 6 ml. of xylene and 3 ml. of tertiarybutanol is refluxed under nitrogen for three hours. The reaction mixture is cooled, ether is added and the resulting slurry is washed with 5% aqueous potassium bicarbonate solution and then with saturated aqueous sodium chloride solution. The organic layer is dried over magnesium sulfate and concentrated to dryness under reduced pressure. The residue is 3-methyl-13-ethyl-8,14-seco-4-oxagona-2,5(10),9(11)-triene-14,17-dione.

Example 4.—3-methyl-13-isopropyl-8,14-seco-4-oxagona-2,5(10),9(11)-triene-14,17-dione A solution of 840 mg. of 2-methyl-5-vinyl-5-hydroxy-4H-5,6,7,8-tetrahydro chromene and 540 mg. of 2-isopropylcyclopentane-1,3-dione in 6 ml. of xylene and 3 ml. of tertiarybutanol is refluxed under nitrogen for three hours. The reaction mixture is cooled, ether is added and the resulting slurry is washed with 5% aqueous potassium bicarbonate solution and then with saturated aqueous sodium chloride solution. The organic layer is dried over magnesium sulfate and concentrated to dryness under reduced pressure. The residue is 3-methyl-13-isopropyl-8,14-seco-4-oxagona-2,5(10),9(11)-triene-14,17-dione.

Example 5.—3,13-dimethyl-4-oxagona-2,5(10),8-14-tetraene-17-one

A solution of 30 mg. of para-toluenesulfonic acid monohydrate in 10 ml. of benzene is concentrated to dryness at 60° C. under nitrogen. A solution of 560 mg. of 3,13-dimethyl-8,14-seco-4-oxagona-2,5(10),9(11) - triene-14,17-dione in 10 ml. of anhydrous benzene is added to a solution of the anhydrous para-toluenesulfonic acid, prepared as above, in 5 ml. of anhydrous benzene. The reaction is maintained at a temperature of 60° C. under a gentle stream of nitrogen for 30 minutes. It is then cooled and 20 ml. of benzene and 20 ml. of water are added to the cooled reaction mixture. The organic phase of the reaction mixture is separated and washed with dilute aqueous potassium bicarbonate solution and then with saturated sodium chloride solution. The washed solution is dried over magnesium sulfate and the solvent is removed under reduced pressure. The residue is 3,13-dimethyl-4-oxagona-2,5(10),8,14-tetraene-17-one.

Example 6.—3-methyl-13-ethyl-4-oxagona-2,5(10),8,14-tetraene-17-one

A solution of 30 mg. of para-toluenesulfonic acid monohydrate in 10 ml. of benzene is concentrated to dryness at 60° C. under nitrogen. A solution of 560 mg. of 3-methyl-13-ethyl-8,14-seco - 4 - oxagona - 2,5(10),9(11)-triene-14,17-dione in 10 ml. of anhydrous benzene is added to a solution of the anhydrous para-toluenesulfonic acid, prepared as above, in 5 ml. of anhydrous benzene. The reaction is maintained at a temperature of 60° C. under a gentle stream of nitrogen for 30 minutes. It is then cooled and 20 ml. of benzene and 20 ml. of water are added to the cooled reaction mixture. The organic phase of the reaction mixture is separated and washed with dilute aqueous potassium bicarbonate solution and then saturated sodium chloride solution. The washed solution is dried over magnesium sulfate and the solvent is removed under reduced pressure. The residue is 3 - methyl-13-ethyl-4-oxagona-2,5(10),8,14-tetraene-17-one.

Example 7.—3-methyl-13-isopropyl-4-oxagona-2,5(10),8,14-tetraene-17-one

A solution of 30 mg. of para-toluenesulfonic acid monohydrate in 10 ml. of benzene is concentrated to dryness at 60° C. under nitrogen. A solution of 560 mg. of 3-methyl-13-isopropyl - 8,14 - seco-4-oxagona-2,5(10),9(11)-triene-14,17-dione in 10 ml. of anhydrous benzene is added to a solution of the anhydrous para-toluenesulfonic acid, prepared as above, in 5 ml. of anhydrous benzene. The reaction is maintained at a temperature of 60° C. under a gentle stream of nitrogen for 30 minutes. It is then cooled and 20 ml. of benzene and 20 ml. of water are added to the cooled reaction mixture. The organic phase of the reaction mixture is separated and washed with dilute aqueous potassium bicarbonate solution and then with saturated sodium chloride solution. The washed solution is dried over magnesium sulfate and the solvent is removed under reduced pressure. The residue is 3-methyl-13-isopropyl-4-oxagona-2,5(10),8,14-tetraene-17-one.

Example 8.—13-methyl-4,5-secogona-8,14-diene-3,5,17-trione

A solution of 500 mg. of 3,13-dimethyl-4-oxagona-2,5(10),8,14-tetraen-17-one in 10 ml. of 50% aqueous acetic acid is heated to a temperature of 90–95° C. and maintained at that temperature for three hours. The solution is cooled and concentrated to near dryness under reduced pressure. Water and chloroform are added to the concentrate and the chloroform layer is removed and washed with 5% aqueous potassium bicarbonate solution and then with saturated aqueous sodium chloride solution. The washed chloroform solution is dried over magnesium sulfate and the chloroform is removed under reduced pressure. The residue is 13-methyl-4,5-secogona-8,14-diene-3,5,17-trione.

Example 9.—13-ethyl-4,5-secogona-8,14-diene-3,5,17-trione

A solution of 500 mg. of 3-methyl-13-ethyl-4-oxagona-2,5(10),8,14-tetraen-17-one in 10 ml. of 50% aqueous acetic acid is heated to a temperature of 90–95° C. and maintained at that temperature for three hours. The solution is cooled and concentrated to near dryness under reduced pressure. Water and chloroform are added to the concentrate and the chloroform layer is removed and washed with 5% aqueous potassium bicarbonate solution and then with saturated aqueous sodium chloride solution. The washed chloroform solution is dried over magnesium sulfate and the chloroform is removed under reduced pressure. The residue is 13 - ethyl-4,5-secogona-8,14-diene-3,5,17-trione.

Example 10.—13-isopropyl-4,5-secogona-8,14-diene-3,5,17-trione

A solution of 500 mg. of 3-methyl-13-isopropyl-4-oxagona-2,5(10),8,14-tetraen-17-one in 10 ml. of 50% aqueous acetic acid is heated to a temperature of 90–95° C. and maintained at that temperature for three hours. The solution is cooled and concentrated to near dryness under reduced pressure. Water and chloroform are added to the concentrate and the chloroform layer is removed and washed with 5% aqueous potassium bicarbonate solution and then with saturated aqueous sodium chloride solution. The washed chloroform solution is dried over magnesium sulfate and the chloroform is removed under reduced pressure. The residue is 13-isopropyl-4,5-secogona-8,14-diene-3,5,17-trione.

Example 11.—13-methyl-4,5-secogona-8-ene-3,5,17-trione

A solution of 400 mg. of 13-methyl-4,5-secogona-8,14-diene-3,5,17-trione in 20 ml. of benzene is hydrogenated at 25° C. and one atmosphere of hydrogen in the presence of 100 mg. of 5% palladium on charcoal. The hydrogenation is stopped when one molecular equivalent of hydrogen is absorbed. The catalyst is removed by filtration and the solvent is removed by distillation under reduced pressure. The residue is 13-methyl-4,5-secogona-8-ene-3,5,17-trione.

Example 12.—13-ethyl-4,5-secogona-8-ene-3,5,17-trione

A solution of 400 mg. of 13-ethyl-4,5-secogona-8,14-diene-3,5,17-trione in 20 ml. of benzene is hydrogenated at 25° C. and one atmosphere of hydrogen in the presence of 100 mg. of 5% palladium on charcoal. The hydrogenation is stopped when one molecular equivalent of hydrogen is absorbed. The catalyst is removed by filtration and the solvent is removed by distillation under reduced pressure. The residue is 13-ethyl-4,5-secogona-8-ene-3,5,17-trione.

Example 13.—13-isopropyl-4,5-secogona-8-ene-3,5,17-trione

A solution of 400 mg. of 13-isopropyl-4,5-secogona-8,14-diene-3,5,17-trione in 20 ml. of benzene is hydrogenated at 25° C. and one atmosphere of hydrogen in the presence of 100 mg. of 5% palladium on charcoal. The hydrogenation is stopped when one molecular equivalent of hydrogen is absorbed. The catalyst is removed by filtration and the solvent is removed by distillation under reduced pressure. The residue is 13-isopropyl-4,5-secogona-8-ene-3,5,17-trione.

Example 14.—19-norandrosta-4,9-diene-3,17-dione

A solution of 200 mg. of 13-methyl-4,5-secogona-8-ene-3,5,17-trione in 20 ml. of methanol containing 0.4 g. of sodium methoxide is refluxed under nitrogen for four hours. The reaction mixture is cooled, neutralized with 15% aqueous acetic acid solution and then concentrated to near dryness under reduced pressure. Water is added to the concentrated reaction mixture and the resulting mixture is extracted with ether. The ether layer is removed, washed with saturated aqueous sodium chloride solution, and dried over magnesium sulfate. The ether is removed by distillation under reduced pressure. The residue is 19-norandrosta-4,9-diene-3,17-dione and is purified by chromatography on magnesium silicate (Florisil).

Example 15.—13-ethyl-4,9-gonadiene-3,17-dione

A solution of 200 mg. of 13-ethyl-4,5-secogona-8-ene-3,5,17-trione in 20 ml. of methanol containing 0.4 g. of sodium methoxide is refluxed under nitrogen for four hours. The reaction mixture is cooled, neutralized with 15% aqueous acetic acid solution and then concentrated to near dryness under reduced pressure. Water is added to the concentrated reaction mixture and the resulting mixture is extracted with ether. The ether layer is removed, washed with saturated aqueous sodium chloride solution, and dried over magnesium sulfate. The ether is removed by distillation under reduced pressure. The residue is 13-ethyl-4.9-gonadiene-3,17-dione and is purified by chromatography on magnesium silicate (Florisil).

Example 16.—13-isopropyl-4,9-gonadiene-3,17-dione

A solution of 200 mg. of 13-isopropyl-4,5-secogona-8-ene-3,5,17-trione in 20 ml. of methanol containing 0.4 g. of sodium methoxide is refluxed under nitrogen for four hours. The reaction mixture is cooled, neutralized with 15% aqueous acetic acid solution and then concentrated to near dryness under reduced pressure. Water is added to the concentrated reaction mixture and the resulting mixture is extracted with ether. The ether layer is removed, washed with saturated aqueous sodium chloride solution, and dried over magnesium sulfate. The ether is removed by distillation under reduced pressure. The residue is 13-isopropyl-4,9-gonadiene-3,17-dione and is purified by chromatography on magnesium silicate (Florisil).

Example 17.—3,13-dimethyl-4-oxagona-2,5(10),8,14-tetraen-17β-ol

A solution of 500 mg. of 3,13-dimethyl-4-oxagona-2,5(10),8,14-tetraen-17-one in 10 ml. of isopropanol is added dropwise to a stirred solution of 350 mg. of sodium borohydride in 8 ml. of isopropanol. The reaction mixture is maintained at 0° C. during the addition and for 40 minutes after addition is complete. Ten milliliters of 15% aqueous acetic acid solution is added dropwise to the reaction mixture followed by the addition of saturated aqueous sodium chloride solution. The resulting mixture is extracted with ether, the ether extract is washed with dilute aqueous potassium bicarbonate solution and dried over magnesium sulfate. The ether is removed by distillation under reduced pressure. The residue is 3,13-dimethyl-4-oxagona-2,5(10),8,14-tetraen-17β-ol.

Example 18.—3-methyl-13-ethyl-4-oxagona-2,5(10),8,14-tetraen-17β-ol

A solution of 500 mg. of 3-methyl-13-ethyl-4-oxagona-2,5(10),8,14-tetraen-17-one in 10 ml. of isopropanol is added dropwise to a stirred solution of 350 mg. of sodium borohydride in 8 ml. of isopropanol. The reaction mixture is maintained at 0° C. during the addition and for 40 minutes after addition is complete. Ten milliliters of 15% aqueous acetic acid solution is added dropwise to the reaction mixture followed by the addition of saturated aqueous sodium chloride solution. The resulting mixture is extracted with ether, the ether extract is washed with dilute aqueous potassium bicarbonate solution and dried over magnesium sulfate. The ether is removed by distillation under reduced pressure. The residue is 3-methyl-13-ethyl-4-oxagona-2,5(10),8,14-tetraen-17β-ol.

Example 19.—3-methyl-13-isopropyl-4-oxagona-2,5(10),8,14-tetraen-17β-ol

A solution of 500 mg. of 3-methyl-13-isopropyl-4-oxagona-2,5(10),8,14-tetraen-17-one in 10 ml. of isopropanol is added dropwise to a stirred solution of 350 mg. of sodium borohydride in 8 ml. of isopropanol. The reaction mixture is maintained at 0° C. during the addition and for 40 minutes after addition is complete. Ten milliliters of 15% aqueous acetic acid solution is added dropwise to the reaction mixture followed by the addition of saturated aqueous sodium chloride solution. The resulting mixture is extracted with ether, the ether extract is washed with dilute aqueous potassium bicarbonate solution and dried over magnesium sulfate. The ether is removed by distillation under reduced pressure. The residue is 3-methyl-13-isopropyl-4-oxagona-2,5(10),8,14-tetraen-17-β-ol.

Example 20.—13-methyl-17β-hydroxy-4,5-secogona-8,14-diene-3,5-dione

A solution of 500 mg. of 3,13-dimethyl-4-oxagona-2,5(10),8,14-tetraen-17β-ol in 10 ml. of 50% aqueous acetic acid is heated to a temperature of 90–95° C. and maintained at that temperature for three hours. The solution is cooled and concentrated to near dryness under reduced pressure. Water and chloroform are added to the concentrate and the chloroform layer is separated and washed with 5% aqueous potassium bicarbonate solution and then with saturated aqueous sodium chloride solution. The washed chloroform solution is dried over magnesium sulfate and the chloroform is removed under reduced pressure. The residue is 13-methyl-17β-hydroxy-4,5-secogona-8,14-diene-3,5-dione.

Example 21.—13-ethyl-17β-hydroxy-4,5-secogona-8,14-diene-3,5-dione

A solution of 500 mg. of 3-methyl-13-ethyl-4-oxagona-2,5(10),8,14-tetraen-17β-ol in 10 ml. of 50% aqueous acetic acid is heated to a temperature of 90–95° C. and maintained at that temperature for three hours. The solution is cooled and concentrated to near dryness under reduced pressure. Water and chloroform are added to the concentrate and the chloroform layer is separated and washed with 5% aqueous potassium bicarbonate solution and then with saturated aqueous sodium chloride solution. The washed chloroform solution is dried over magnesium sulfate and the chloroform is removed under reduced pressure. The residue is 13-ethyl-17β-hydroxy-4,5-secogona-8,14-diene-3,5-dione.

Example 22.—13-isopropyl-17β-hydroxy-4,5-secogona-8,14-diene-3,5-dione

A solution of 500 mg. of 3-methyl-13-isopropyl-4-oxagona-2,5(10),8,14-tetraen-17β-ol in 10 ml. of 50% aqueous acetic acid is heated to a temperature of 90–95° C. and maintained at that temperature for three hours. The solution is cooled and concentrated to near dryness under reduced pressure. Water and chloroform are added to the concentrate and the chloroform layer is separated and washed with 5% aqueous potassium bicarbonate solution and then with saturated aqueous sodium chloride solution. The washed chloroform solution is dried over magnesium sulfate and the chloroform is removed under reduced pressure. The residue is 13-isopropyl-17β-hydroxy-4,5-secogona-8,14-diene-3,5-dione.

Example 23.—13-methyl-17β-hydroxy-4,5-secogona-8-ene-3,5-dione

A solution of 400 mg. of 13-methyl-17β-hydroxy-4,5-secogona-8,14-diene-3,5-dione in 20 ml. of benzene is hydrogenated at 25° C. and one atmosphere of hydrogen in the presence of 100 mg. of 5% palladium on charcoal. The hydrogenation is stopped when one molecular equivalent of hydrogen is absorbed. The catalyst is removed by filtration and the solvent is removed by distillation under reduced pressure. The residue is 13-methyl-17β-hydroxy-4,5-secogona-8-ene-3,5-dione.

Example 24.—13-ethyl-17β-hydroxy-4,5-secogona-8-ene-3,5-dione

A solution of 400 mg. of 13-ethyl-17β-hydroxy-4,5-secogona-8,14-diene-3,5-dione in 20 ml. of benzene is hydrogenated at 25° C. and one atmosphere of hydrogen in the presence of 100 mg. of 5% palladium on charcoal. The hydrogenation is stopped when one molecular equivalent of hydrogen is absorbed. The catalyst is removed by filtration and the solvent is removed by distillation under reduced pressure. The residue is 13-ethyl-17β-hydroxy-4,5-secogona-8-ene-3,5-dione.

Example 25.—13-isopropyl-17β-hydroxy-4,5-secogona-8-ene-3,5-dione

A solution of 400 mg. of 13-isopropyl-17β-hydroxy-4,5-secogona-8,14-diene-3,5-dione in 20 ml. of benzene is hydrogenated at 25° C. and one atmosphere of hydrogen in the presence of 100 mg. of 5% palladium on charcoal. The hydrogenation is stopped when one molecular equivalent of hydrogen is absorbed. The catalyst is removed by filtration and the solvent is removed by distillation under reduced pressure. The residue is 13-isopropyl-17β-hydroxy-4,5-secogona-8-ene-3,5-dione.

Example 26.—13-methyl-17β-hydroxy-gona-4,9-dien-3-one

A solution of 200 mg. of 13-methyl-17β-hydroxy-4,5-secogona-8-ene-3,5-dione in 20 ml. of methanol containing 0.4 g. of sodium methoxide is refluxed under nitrogen for fours hours. The reaction mixture is cooled, neutralized with 15% aqueous acetic acid solution and then concentrated to near dryness under reduced pressure. Water is added to the concentrated reaction mixture and the resulting mixture is extracted with ether. The ether layer is removed, washed with saturated aqueous sodium chloride solution, and dried over magnesium sulfate. The ether is removed by distillation under reduced pressure. The residue is 13-methyl-17β-hydroxy-gona-4,9-dien-3-one and is purified by chromatography on magnesium silicate (Florisil).

Example 27.—13-ethyl-17β-hydroxy-gona-4,9-diene-3-one

A solution of 200 mg. of 13-ethyl-17β-hydroxy-4,5-secogona - 8 - ene - 3,5 - dione in 20 ml. of methanol containing 0.4 g. of sodium methoxide is refluxed under nitrogen for four hours. The reaction mixture is cooled, neutralized with 15% aqueous acetic acid solution ond then concentrated to near dryness under reduced pressure. Water is added to the concentrated reaction mixture and the resulting mixture is extracted with ether. The ether layer is removed, washed with saturated aqueous sodium chloride solution, and dried over magnesium sulfate. The ether is removed by distillation under reduced pressure. The residue is 13-ethyl-17β-hydroxy-gona-4,9-diene-3-one and is purified by chromatography on magnesium silicate (Florisil).

Example 28.—13-isopropyl-17β-hydroxy-gono-4,9-diene-3-one

A solution of 200 mg. of 13-isopropyl-17β-hydroxy-4,5-secogona-8-ene-3,5-dione in 20 ml. of methanol containing 0.4 g. of sodium methoxide is refluxed under nitrogen for four hours. The reaction mixture is cooled, neutralized with 15% aqueous acetic acid solution and then concentrated to near dryness under reduced pressure. Water is added to the concentrated reaction mixture and the resulting mixture is extracted with ether. The ether layer is removed, washed with saturated aqueous sodium chloride solution, and dried over magnesium sulfate. The ether is removed by distillation under reduced pressure. The residue is 13-isopropyl-17β-hydroxy-gono-4,9-dien-3-one and is purified by chromatography on magnesium silicate (Florisil).

Example 29.—19-norandrosta-4,9-diene-3,17-dione

A solution of 2.67 g. of chromium trioxide in 2.3 ml. of concentrated sulfuric acid is diluted with water to 100 ml. 0.30 ml. of the chromic-acid-aqueous sulfuric acid reagent is added to a stirred solution of 300 mg. of 13-methyl - 17β-hydroxy-gona-4,9-diene-3-one in 50 ml. of acetone which is kept at 10° C.

Five minutes after addition is complete, 200 ml. of cold water are added. The precipitated product is filtered, washed with water, and dried in air. Crystallization from a mixture of acetone and hexane gives 19-norandrosta-4,9-diene-3,17-dione.

Various changes and modifications may be made in carrying out the present invention without departing from the spirit and scope thereof. Insofar as these changes and modifications are within the purview of the annexed claims, they are to be considered as part of our invention.

What is claimed is:

1. 2 - methyl - 5 - vinyl - 5 - hydroxy - 4H-5,6,7,8-tetrahydrochromene.

2. 3 - methyl - 13 - lower alkyl-8,14-seco-4-oxagona-2,5(10),9(11)-triene-14,-17-dione.

3. 3,13 - dimethyl - 8,14 - seco-4-oxagona-2,5(10), 9(11)-triene-14,17-dione.

4. 3 - methyl - 13 - lower alkyl-4-oxagona-2,5(10), 8,14-tetraen-17-one.

5. 3,13 - dimethyl - 4 - oxagona-2,5(10),8,14-tetraen-17-one.

6. 13 - lower alkyl - 4,5-secogona-8,14-diene-3,5,17-trione.

7. 13 - methyl - 4,5 - secogona - 8,14 - diene-3,5,-17-trione.

8. 13-lower alkyl-4,5-secogona-8-ene-3,5,17-trione.

9. 13-methyl-4,5-secogona-8-ene-3,5,17-trione.

10. 3 - methyl - 13 - lower alkyl - 4-oxagona-2,5(10), 8,14-tetraen-17β-ol.

11. 3,13 - dimethyl - 4 - oxagona - 2,5(10),8,14-tetraen-17β-ol.

12. 13 - lower alkyl - 17β-hydroxy-4,5-secogona-8,14-diene 3,5-dione.

13. 13 - methyl - 17β - hydroxy - 4,5-secogona-8,14-diene-3,5-dione.

14. 13 - lower alkyl-17β-hydroxy-4,5-secogona-8-ene-3,5-dione.

15. 13 - methyl - 17β - hydroxy-4,5-secogona-8-ene-3,5-dione.

References Cited

UNITED STATES PATENTS

| | | | |
|---|---|---|---|
| 3,101,349 | 8/1963 | Pappo et al. | 260—345.2 |
| 3,115,507 | 12/1963 | Nominé et al. | 260—586 XR |
| 3,138,617 | 6/1964 | Nominé et al. | 260—345.2 |
| 3,288,811 | 11/1966 | Krakower et al. | 260—345.2 |
| 3,312,717 | 4/1967 | Baran | 260—345.2 XR |

OTHER REFERENCES

Smith et al.: Experientia, vol. 20, pp. 418–9 (1964).

Houisman et al.: Rev. Trav. Chim., vol. 82, pp. 898–900 (1963).

HENRY R. JILES, *Primary Examiner.*

JOHN M. FORD, *Assistant Examiner.*

U.S. Cl. X.R.

260—397.3, 397.45, 586, 999